United States Patent
Thebault et al.

(10) Patent No.: US 7,736,554 B2
(45) Date of Patent: Jun. 15, 2010

(54) METHOD OF MANUFACTURING A PART OUT OF IMPERVIOUS THERMOSTRUCTURAL COMPOSITE MATERIAL

(75) Inventors: Jacques Thebault, Bordeaux (FR); Clément Bouquet, Bordeaux (FR); Michel Laxague, Bordeaux Cauderan (FR); Hervé Evrard, Le Haillan (FR)

(73) Assignee: Snecma Propulsion Solide, Le Haillan (FR)

( * ) Notice: Subject to any disclaimer, the term of this patent is extended or adjusted under 35 U.S.C. 154(b) by 25 days.

(21) Appl. No.: 11/105,851

(22) Filed: Apr. 14, 2005

(65) Prior Publication Data
US 2005/0244581 A1   Nov. 3, 2005

(30) Foreign Application Priority Data
May 3, 2004   (FR) .................................. 04 04696

(51) Int. Cl.
*C04B 35/653*   (2006.01)
*C04B 35/565*   (2006.01)
*F16D 69/02*    (2006.01)

(52) U.S. Cl. .................. 264/29.1; 264/643; 264/29.5; 427/249.4

(58) Field of Classification Search ................ 264/29.3, 264/29.5, 29.7, 29.1, 643
See application file for complete search history.

(56) References Cited

U.S. PATENT DOCUMENTS

| | | | | |
|---|---|---|---|---|
| 4,120,731 A | * | 10/1978 | Hillig et al. ................ 501/90 |
| 4,275,095 A | * | 6/1981 | Warren ........................ 427/228 |
| 4,508,762 A | * | 4/1985 | Rousseau .................... 427/228 |
| 4,554,203 A | | 11/1985 | Grabmaier et al. .......... 428/229 |
| 4,766,013 A | | 8/1988 | Warren |
| 4,772,508 A | * | 9/1988 | Brassell ....................... 428/218 |
| 5,205,970 A | * | 4/1993 | Brun et al. .................. 427/227 |
| 5,330,854 A | | 7/1994 | Singh et al. ................. 428/698 |
| 5,336,350 A | | 8/1994 | Singh |
| 5,580,658 A | * | 12/1996 | Maruyama et al. .......... 428/408 |
| 5,683,028 A | * | 11/1997 | Goela et al. ................. 228/121 |
| 6,245,424 B1 | | 6/2001 | Lau et al. ..................... 428/368 |
| 7,163,653 B2 | * | 1/2007 | Ehnert ........................ 264/271.1 |
| 7,169,465 B1 | * | 1/2007 | Karandikar et al. ........ 428/312.8 |
| 2002/0109250 A1 | * | 8/2002 | Kim et al. ................... 264/29.7 |

FOREIGN PATENT DOCUMENTS

| | | |
|---|---|---|
| EP | 1028098 A | 12/2000 |
| JP | 3290367 | 12/1991 |
| WO | WO 02/33285 * | 4/2002 |

OTHER PUBLICATIONS

Xu, Y., L. Cheng, L. Zhang, Carbon/silicon carbide composites prepared by chemical vapor infiltration combined with silicon melt infiltration, Carbon, vol. 37 (1999) pp. 1179-1187.*

* cited by examiner

*Primary Examiner*—Matthew J. Daniels
(74) *Attorney, Agent, or Firm*—Weingarten, Schurgin, Gagnebin & Lebovici LLP (57) ABSTRACT

A method of manufacturing a part out of impervious thermostructural composite material, the method comprising forming a porous substrate from at least one fiber reinforcement made of refractory fibers, and densifying the reinforcement by a first phase of carbon and by a second phase of silicon carbide. The method then continues by impregnating the porous substrate with a composition based on molten silicon so as to fill in the pores of the substrate.

15 Claims, 3 Drawing Sheets

METHOD OF MANUFACTURING A PART OUT OF IMPERVIOUS THERMOSTRUCTURAL COMPOSITE MATERIAL

This application claims priority to a French application No. 04 04696 filed May 3, 2004.

BACKGROUND OF THE INVENTION

Thermostructural composite materials are known for their good mechanical properties and for their ability to conserve these properties at high temperature. They comprise carbon/carbon (C/C) composite materials constituted by carbon fiber reinforcement densified by a carbon matrix, and ceramic matrix composite (CMC) material formed by reinforcement of refractory fibers (carbon or ceramic) densified by a matrix that is ceramic, at least in part. Examples of CMCs are C/SiC composites (carbon fiber reinforcement and silicon carbide matrix), C/C—SiC composites (carbon fiber reinforcement and a matrix comprising a carbon phase, generally close to the fibers, and a silicon carbide phase), and SiC/SiC composites (both reinforcing fibers and matrix made of silicon carbide). An interphase layer may be interposed between the reinforcing fibers and the matrix in order to improve the mechanical behavior of the material.

The usual methods of obtaining parts made of thermostructural composite material use the liquid process or the gas process.

The liquid process consists in making a fiber preform having substantially the shape of a part that is to be obtained, and that is to constitute the reinforcement of the composite material, and in impregnating said preform with a liquid composition containing a precursor of the matrix material. As a general rule, the precursor is in the form of a polymer, such as a resin, possibly diluted in a solvent. The precursor is transformed into a refractory phase by heat treatment, after eliminating the solvent, if any, and after cross-linking the polymer. A plurality of successive impregnation cycles can be performed in order to reach the desired degree of densification. By way of example, liquid precursors of carbon may be resins having a relatively high coke content, such as phenolic resins, whereas liquid precursors of ceramic, in particular precursors of SiC, may be resins of the polycarbosilane (PCS) or the polytitanocarbosilane (PTCS) or the polysilazane (PSZ) type.

The gas process consists in chemical vapor infiltration. The fiber preform corresponding to the part to be made is placed in an oven into which a reaction gas phase is admitted. The pressure and the temperature that exist inside the oven and the composition of gas phase are selected in such a manner as to allow the gas to diffuse within the pores of the preform so as to form the matrix therein by depositing a solid material in contact with the fibers, said material resulting from a component of the gas decomposing or from a reaction between a plurality of components. For example, gaseous precursors of carbon may be hydrocarbons that give carbon by cracking, e.g. methane, and a gaseous preform of ceramic, in particular of SiC, may be methyltrichlorosilane (MTS) giving SiC by decomposing the MTS (possibly in the presence of hydrogen).

There also exist combined methods using both the liquid and the gas processes.

Because of their properties, such thermostructural composite materials find applications in a variety of fields, whenever there is a need for parts that are to be subjected to high levels of thermomechanical stress, for example in aviation, in space, or in the nuclear industry.

Nevertheless, whatever the method of densification that is used, parts made of thermostructural composite material always present internal porosity that is open, i.e. in communication with the outside of the part. The porosity stems from the inevitably incomplete nature of the densification of fiber preforms. It leads to the presence of pores and/or cracks of greater or smaller dimensions that communicate with one another. As a result, parts made of thermostructural composite material are not impervious, which means, in particular, that they cannot be used directly for making walls that are cooled by a circulating fluid, for example wall elements for a rocket thruster nozzle, or combustion chamber wall elements for a gas turbine, or indeed wall elements for a plasma confinement chamber in a nuclear fusion reactor.

Treatments exist for parts made of thermostructural composite material, seeking to close the pores present in the material. By way of example, U.S. Pat. No. 4,275,095 describes a method of manufacturing a composite material part in which carbon fiber reinforcement consolidated by a carbon matrix is impregnated with molten silicon which reacts with the carbon present in the material so as to form silicon carbide. The material constituted in that way is still porous, so the part is coated in a layer of silicon carbide for closing the pores in its surface. However, composite material parts made in that way are only relatively impervious and they are suitable only for protecting the surface of the part against oxidation without conferring the part with a degree of imperviousness that would enable it to be put into contact with a fluid without any risk of leakage. Forming silicon carbide around fibers by causing the carbon to react with molten silicon inevitably leads to an increase in volume (in the range 10% to 20%), and that generates stresses which lead to cracks in the material. Consequently, in addition to the fact that the resulting material remains porous after the silicon carbide has been formed, thus requiring an additional deposit of silicon carbide on its surface, the material also presents cracks which mean that it is not possible to guarantee a high degree of imperviousness, in particular because of the mechanical and/or thermal stresses to which the parts might be subjected.

U.S. Pat. No. 4,766,013 describes another method of manufacture in which silicon carbide is deposited directly on reinforcing fibers by chemical vapor infiltration. Nevertheless, chemical vapor infiltration of silicon carbide, even when repeated with machining being performed between two infiltration operations so as to open up the pores at the surface, still does not suffice to obtain a part without any residual porosity. The part is thus not impervious at this stage of manufacture, and requires an additional deposit of silicon carbide to fill in the pores at the surface of the part, such that any damage to this surface coating compromises the imperviousness of the part.

OBJECT AND SUMMARY OF THE INVENTION

An object of the invention is to provide a composite material part presenting not only the mechanical properties at high temperatures that are specific to thermostructural composite materials, but that also presents a level of imperviousness that enables it to be used with fluids, even under pressure, without any risk of leakage.

This object is achieved with a method of manufacturing a part out of thermostructural composite material that is impervious, the method comprising forming a porous substrate from at least one fiber reinforcement made of refractory fibers, densifying the reinforcement by a first phase of carbon and by a second phase of silicon carbide, and, in accordance with the invention, impregnating the porous substrate with a composition based on molten silicon in order to fill in the pores of the substrate.

Thus, the method of the present invention makes it possible to manufacture thermostructural composite materials presenting a high level of imperviousness. Prior to the substrate being impregnated with molten silicon, the fibers are coated in a matrix phase of silicon carbide. The silicon which then penetrates into the substrate cannot come into contact with the carbon of the fibers or the carbon of the matrix so it cannot react therewith and form silicon carbide, thereby avoiding any phenomenon of an increase of volume inside the material which would lead to cracking. This ensures that a high degree of imperviousness is maintained within the material.

In addition, silicon carbide constitutes a good interface which facilitates mechanical bonding of silicon within the substrate. Silicon wets silicon carbide well. Consequently, the residual pores within the substrate can readily be filled in with molten silicon so as to make the material impervious throughout its thickness. The presence of silicon within the material also contributes to providing good protection against cracks appearing in the material, in particular on being raised to high temperature.

The fiber reinforcement may be formed with refractory fibers selected in particular from silicon carbide fibers and carbon fibers having a natural cellulose precursor such as cotton or flax, or an artificial precursor such as rayon. Other carbon fiber precursors such as pitch, polyacrylonitrile (PAN), or organic resin (phenolic resin, . . . ) may also be used. The refractory fibers used to form the fiber reinforcement may also be carbon-core fibers such as carbon fibers siliconized on the surface.

The densification or consolidation of the fiber reinforcement by the first carbon phase can be performed using the liquid process or the gas process. With the liquid process, densification comprises impregnating the reinforcement with a liquid composition containing a polymer that is a precursor of carbon, cross-linking the polymer, and transforming the cross-linked polymer into carbon. With the gas process, consolidation is performed by chemical vapor infiltration of pyrolytic carbon in the gaseous phase, optionally followed by a heat treatment step.

The second phase of silicon carbide can be made by the liquid process or by the gas process. With the liquid process, densification comprises impregnating the substrate with a liquid composition containing an organosilicon compound that is a precursor of silicon carbide, and transforming the precursor by heat treatment or ceramization, with the gas process, densification is performed by chemical vapor infiltration of silicon carbide in gaseous form.

A step of removing crust from the material can be performed in order to open up the pores prior to the operation of impregnation by means of the silicon-based composition for blocking said pores, thus making it easier for the silicon-based composition to diffuse within the substrate, thereby improving the uniformity and the imperviousness of the material.

The silicon-based composition may be constituted by silicon or by an alloy of silicon and at least one other material selected in particular from titanium, zirconium, molybdenum, and germanium.

In a particular implementation of the invention, the substrate can be impregnated with the silicon-based composition using a receptacle of refractory material, such as graphite, containing the molten silicon-based composition and at least one stud for supporting the substrate, the stud forming a wick for bringing the molten silicon-based composition by capillarity towards the substrate so that it penetrates into the pores of the substrate. The side faces and the top face of the substrate may be coated in an anti-wetting agent that forms a barrier against the silicon-based composition so as to prevent it from going beyond the substrate, and thus improving impregnation of the substrate. On the top face of the substrate, the thickness of the layer must be sufficiently fine to avoid obstructing the macro-pores in the surface of the substrate so as to allow the gas that is expelled from the pores within the substrate to escape. The anti-wetting agent used may be boron nitride (BN) or one or more oxides.

The invention also provides a method of manufacturing a structure out of thermostructural composite material that is impervious.

This object is achieved by a method in which at least two parts are made of impervious thermostructural composite material as defined above, and said parts are assembled together by brazing after interposing a brazing composition between the surfaces of the parts that are to in contact. This method can be used to make impervious structures of complex shape, such as fluid circulation channels, that would be difficult to obtain directly as single pieces.

A deposit of silicon carbide can be formed on the surfaces of parts that are to be assembled together by chemical vapor infiltration. Such a deposit can be formed prior to brazing in order to avoid any interaction between the brazing compound and the silicon-based composition present in the material, or after brazing in order to form protection against oxidation. In addition, it is possible to apply an anti-wetting agent forming a barrier against brazing on those portions of the parts that are not to be brazed so as ensure that the brazing compound wets only those portions of the surfaces that are to be assembled together.

The brazing compositions used may, in particular, be compositions based on silicon or on silicides, and also metal compositions such as the composition Ticusil® sold by the supplier Wesgo Metals.

A structure may also be made by assembling together a plurality of reinforcements by using a method of the invention. Under such circumstances, the porous substrate is made up from a plurality of fiber reinforcements made of refractory fibers and densified with a first phase of carbon and a second phase of silicon carbide, as described above. The fiber reinforcements are held in contact against each other during the operation of impregnating the substrate with the composition based on molten silicon so as to perform bonding between the contacting surfaces of the reinforcements. This enables a single operation to achieve imperviousness and bonding of the reinforcements of the substrate.

A deposit of silicon carbide can also be made using chemical vapor impregnation after the operation of impregnating the composition with the composition based on molten silicon.

BRIEF DESCRIPTION OF THE DRAWINGS

Other characteristics and advantages of the invention appear from the following description of particular embodiments of the invention given as non-limiting examples, and with reference to the accompanying drawings, in which.

DETAILED DESCRIPTION OF EMBODIMENTS

The method of the invention for manufacturing a part out of thermostructural composite material that is impervious comprises forming a porous substrate of C/C—SiC composite (reinforcement made of carbon fibers or carbon-core fibers and matrix comprising a carbon phase and a silicon carbide phase), and impregnating the porous substrate as formed in this way with molten silicon so as to fill in its pores and make it highly impervious.

Figure 1:
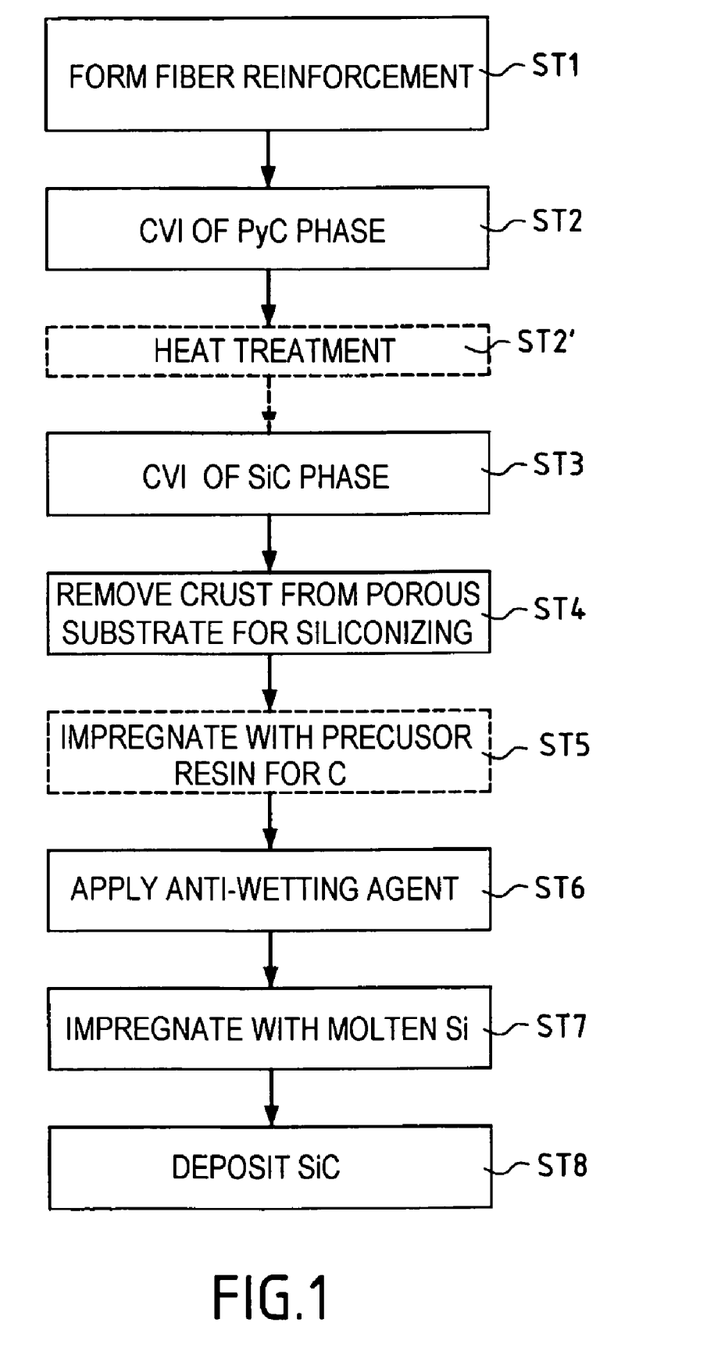
FIG. 1 is a flow chart showing successive steps in an implementation of the method in accordance with the invention.

With reference to FIG. 1, an implementation of a method in accordance with the invention for manufacturing a part out of thermostructural composite material that is impervious comprises the following steps.

The first step (step ST1) consists in forming fiber reinforcement from refractory fibers, in particular carbon fibers or carbon-core fibers. It is preferable to select fibers having a coefficient of expansion that is as compatible as possible with the coefficients of the material that are to be present in the final part made in accordance with the invention. That is to say fibers which present a coefficient of thermal expansion close to the coefficients of the materials concerned, i.e. close both to the coefficient of silicon carbide and the coefficient of silicon. With such fibers, the stresses due to differential dimensional variations are limited, and consequently cracking of the material is limited.

The fibers used may be fibers of silicon carbide or carbon fibers having a natural cellulose precursor such as cotton or flax, or an artificial precursor such as rayon. Other carbon precursors such as pitch, polyacrylonitrile (PAN), or organic resin (phenolic resin, . . . ) may also be used. The fiber reinforcement may also be made using carbon-core fibers such as carbon fibers that have been siliconized on the surface.

The fiber reinforcement may be formed by superposing or draping two-dimensional fiber layers such as sheets, or knitted or woven layers, which may be bonded together by needling or by stitching, or which may be assembled by means of a felt, or indeed which may be formed by three-dimensional weaving, braiding, or knitting, or using any other known process.

The fiber reinforcement is then densified by matrix phases obtained using the liquid process or the gas process in order to obtain a substrate of porous thermostructural material which is then processed so as to be made impervious by being impregnated with molten silicon.

The first step of densification (or consolidation) consists in depositing pyrolytic carbon (PyC) on the reinforcing fibers, e.g. by chemical vapor infiltration (step ST2). In well-known manner, such a pyrolytic carbon can be obtained by infiltration using a gas containing a carbon precursor such as methane gas. In conventional manner, a PyC deposit or interphase formed on the fibers prior to densification using SiC improves bonding between the fibers and the matrix, and consequently improves the mechanical properties of the composite material. It also improves the thermal conductivity of the material, particularly when the PyC deposit is thick. Conduction takes place preferentially via the fibers and the PyC, rather than via SiC. The greater the thickness of PyC, the lower the thermal resistance between plies. Typically, the PyC deposit is 1 micrometer (µm) to 10 µm thick.

Heat treatment (step ST2') may optionally be performed after depositing the PyC in order to further increase the conductivity of the pyrolytic carbon.

This first densification step may also be performed using the liquid process which, in conventional manner, comprises impregnating the reinforcement with a liquid composition containing a polymer or a pitch that is a precursor of carbon, in cross-linking the polymer, and in transforming the cross-linked polymer into carbon.

In the second densification step, SiC is deposited using the liquid process or the gas process. In the example described herein, SiC is deposited by chemical vapor infiltration (step ST3). In conventional manner, the infiltration is performed using a process gas containing a precursor of SiC such as methyltrichlorosilane (MTS) that gives SiC by the MTS decomposing, possibly in the presence of hydrogen gas ($H_2$). The SiC deposit avoids direct contact and possible reaction between the carbon of the fibers and the silicon that is used during the subsequent siliconizing. Thus, the thickness of the SiC is better controlled than it would be if siliconizing were to be performed directly on the PyC. This avoids the risks of damaging fibers by the siliconizing while guaranteeing a uniform thickness of PyC.

The second densification step may also be performed using the liquid process by using, in conventional manner, a liquid impregnation composition containing one or more precursors of SiC such as PCS, PTCS, or PSZ.

After depositing SiC, the surface of the substrate is machined (step ST4). This machining seeks to open the pores in the surface of the substrate (i.e. a crust is removed) so as to make the substrate easier to impregnate with silicon and so as to come very close to the final shape of the part that is to be made.

At this stage of manufacture, the substrate still presents pores that are to be filled in by impregnating the substrate with molten silicon to make the material impervious. Prior to being impregnated with molten silicon, the pores within the substrate can be subdivided by forming one or more aerogels or xerogels of refractory material within the substrate using the method described in French patent application No. 03/01871.

Figure 2:
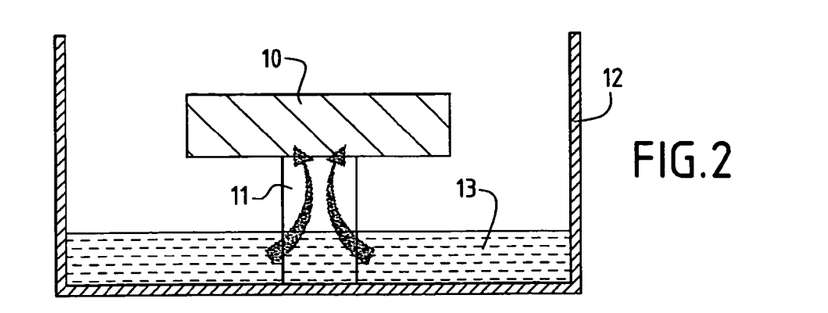
FIGS. 2 and 3 are diagrams showing the implementation of an operation of impregnation with a silicon-based composition in accordance with the method of the invention.

The porous substrate can be impregnated with molten silicon by capillarity. FIG. 2 shows an embodiment of equipment for performing impregnation in this manner. In FIG. 2, a porous substrate 10 of C/C—SiC composite material obtained using the above-described manufacturing steps is positioned on one or more studs 11. The studs 11 are made of a material that enables them to act as wicks for conveying silicon by capillarity towards the substrate. By way of example, the studs may be made of a carbon-carbon composite material having relative density lying in the range 1.2 to 1.4. The assembly comprising the studs and the substrates is placed in a graphite receptacle 12, with a silicon-based composition 13 being deposited in the bottom of the receptacle. The temperature is then raised to about 1500° C. under a secondary vacuum in an oven. This silicon-based composition then melts and is conveyed by capillarity through the stud(s) 11 to the substrate in the direction represented by arrows in FIG. 2 so as to fill the pores of the substrate 10 (step ST7). The studs 11 then act as wicks enabling the molten silicon to migrate towards the substrate. Such a technique of impregnating by capillarity is described in particular in the following patent documents: FR 2 653 763, U.S. Pat. No. 4,626,516, and EP 0 636 700. The term "silicon-based composition" is used herein to mean silicon on its own or alloyed, e.g. an alloy of silicon with at least one material selected in particular from titanium, zirconium, molybdenum, and germanium, with silicon preferably being in the majority in the alloy. To simplify the description, it is assumed below that the composition 13 is constituted by silicon.

The pores of the material can thus be filled with silicon. The use of silicon presents the advantage of possessing good progression by capillarity over SiC, since SiC is wetted well by silicon. It also enables the thermal conductivity of the material to be increased.

Prior to impregnating the substrate with silicon (step ST7), an anti-wetting agent such as boron nitride (BN) can be applied to prevent the silicon from overflowing either from the receptacle or from the substrate (step ST6).

Figure 3:
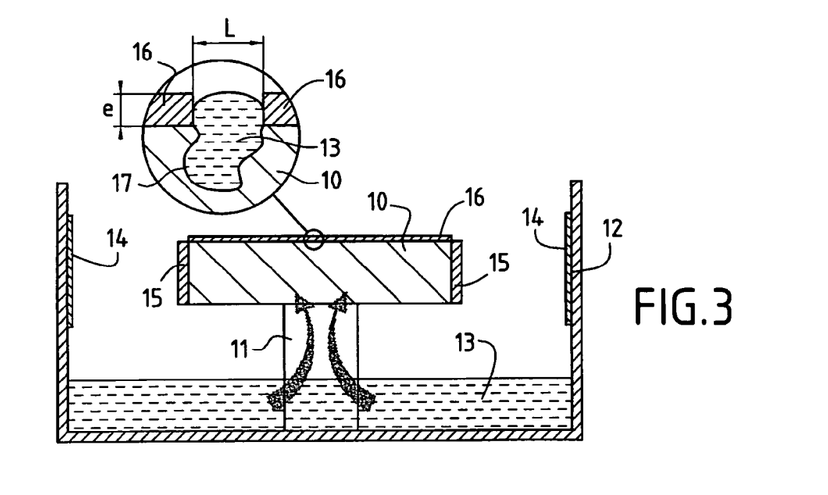

The use of such an anti-wetting agent is illustrated in FIG. 3 which shows a substrate 10 placed on one or more studs 11 standing in the graphite receptacle 12 containing the composition 13. These elements are identical to those described with reference to FIG. 2. Unlike the implementation shown in FIG. 2, the inside wall of the graphite receptacle 12 is coated in an anti-wetting agent 14 above the silicon level in order to prevent the silicon from rising up the wall and overflowing from the receptacle.

Similarly, the anti-wetting agent may be used on the substrate so as to prevent silicon from overflowing out from the substrate, and thus obliging it to impregnate the substrate throughout its thickness. For this purpose, an anti-wetting layer 15 is applied all around the sides of the substrate 10 so as to force the silicon conveyed by the studs 11 to penetrate throughout the thickness of the substrate as far its top surface. In addition, a fine layer 16 of the same anti-wetting agent can be applied to the top surface of the substrate so as to avoid the silicon remaining on the surface because of the surface pores being closed too quickly. This enables the silicon that has risen to the surface of the substrate to move back down within the substrate until it is impregnated completely. Nevertheless, the thickness of the anti-wetting layer applied to the top face of the substrate must be sufficiently fine to avoid said layer itself closing open pores since that would impede the evacuation of gas from the substrate. While the substrate is being impregnated by the molten silicon, gas is released (e.g. SiO). Care must be taken to ensure that this gas does not remain captive in the closed pores of the substrate since that would limit its imperviousness. The anti-wetting agent is generally applied by being sprayed from an aerosol can. As shown in the enlargement in FIG. 3, the pores 17 present at the surface of the substrate form openings having a mean length L of about 100 µm. The thickness $\underline{e}$ of the fine anti-wetting layer 16 must therefore be sufficiently fine to avoid closing the pores 17. The thickness $\underline{e}$ of the layer 16 lies typically amongst values that are less than half the length L of the pores (i.e. e<L/2), which in this example is around 50 µm. Thus, the gas expelled from the substrate during impregnation with silicon can escape through the open pores while the silicon is rising to the surface, but without overflowing since it cannot wet the top of the substrate where it is protected by the fine layer of the anti-wetting agent.

Prior to the step of impregnation with the molten silicon (step ST7), and possibly applying an anti-wetting agent (step ST6), the substrate may previously be impregnated with a resin that is a precursor of carbon (step ST5). This resin is then pyrolyzed on raising the temperature to 1500° C., as takes place in the oven in order to melt the silicon. If the resin is introduced in the form of an aerogel or a xerogel, as described for example in patent document PCT/FR04/00345, that enables a carbon-containing lattice of filaments to be created in the pores, thereby enhancing good filling of the pores in the substrate by means of silicon.

After the porous substrate has been impregnated with the molten silicon, a machining step may be performed to remove any spikes or beads of silicon that has passed through the material during impregnation so as to form projections on the surface of the part (typically having a maximum dimension of a few tens of micrometers). Such machining consists in milling or polishing so as to eliminate the projections at least on those surfaces of the part where that is necessary, such as surfaces that are to form docking panels for brazing to some other part.

Silicon carbide may optionally be deposited by chemical vapor infiltration (step ST8) on the outside surfaces of the part. This infiltration is performed in an oven having a gas admitted thereto that is a precursor of silicon carbide, such as methyltrichlorosilane (MTS) which produces silicon carbide by the MTS decomposing. The natures of the reaction gases used and the pressure and temperature conditions needed to obtain deposits of silicon carbide by chemical vapor infiltration are themselves well known.

A part is thus obtained that is made of a thermostructural composite material that presents very good imperviousness. In this respect, imperviousness has been measured on samples made in accordance with the method of the invention.

Figure 4:
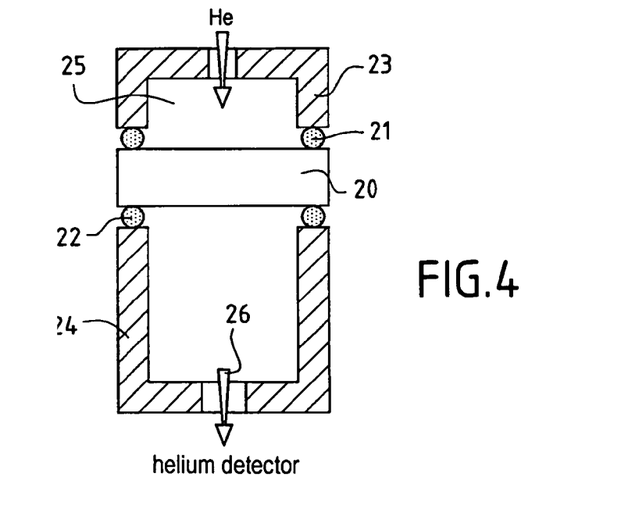
FIG. 4 is a diagram of the device used to measure the degree of imperviousness.

FIG. 4 is a diagram of the apparatus used for measuring the imperviousness of samples. A sample 20 in the form of a disk having a test area with a diameter of 20 millimeters (mm) is placed between two sealing rings 21 and 22. The face of the sample 20 situated beside the ring 21 co-operates with an enclosure 23 to form a confinement space containing helium at a pressure of 1 bar. The bottom face of the substrate in contact with the ring 22 is hermetically connected to a device 24 that constitutes a vacuum pump and that directs any leaks that pass through the sample to a helium detector (not shown, but via arrow 26) in order to measure the level of leakage.

Leakage is measured in pascal cubic meters per second ($Pa \cdot m^3/s$) corresponding to the drop in pressure DP that would be seen by a volume V of helium at a pressure of 1 bar were it to leak during time $\underline{t}$ through a surface (in this case of diameter equal to 20 mm), i.e. $(DP \times V/t) = Pa \cdot m^3/s$.

Table I below shows the results of leakage measurements performed on batches of samples manufactured firstly using the method of the invention and secondly using another technique. The measurements given in column 1 correspond to the measurements performed on samples that were manufactured in accordance with the method of the invention and that included in particular using molten silicon to impregnate a porous substrate made of carbon fibers densified by a matrix comprising a first phase of carbon and a second phase of silicon carbide as described above. The measurements in column 2 correspond to measurements performed on samples likewise made from a porous substrate made using the same fibers and consolidated by a matrix comprising a first phase of carbon and a second phase of silicon carbide, but that was made impervious by depositing a layer of SiC by the gas process ("SiC-CVI") after applying a liquid precursor of SiC and ceramizing it ("SiC painting") as described in patent document PCT/FR04/00202.

TABLE I

|  | 1 | 2 |
|---|---|---|
| Type of leakproofing | Impregnation with molten Si on SiC | SiC painting + SiC-CVI |
| Leakage measured on samples (in $Pa \cdot m^3/s$) | $<10^{-9}$ | $1 \times 10^{-6}$ |

It can be seen that the leakage of the samples manufactured in accordance with the method of the invention is much better. The level measured for these samples coincides with measurement background noise, i.e. practically no leakage was detected.

Thus, the manufacturing method of the invention enables thermostructural composite material parts to be obtained that not only present good thermomechanical properties, but that also present high levels of imperviousness to gas and afortiori to liquid (e.g. kerosene, liquid hydrogen, or liquid oxygen). With such a high level of imperviousness, it is possible, for example, to make structures within which fluids can circulate without any risk of leakage.

Figure 5:
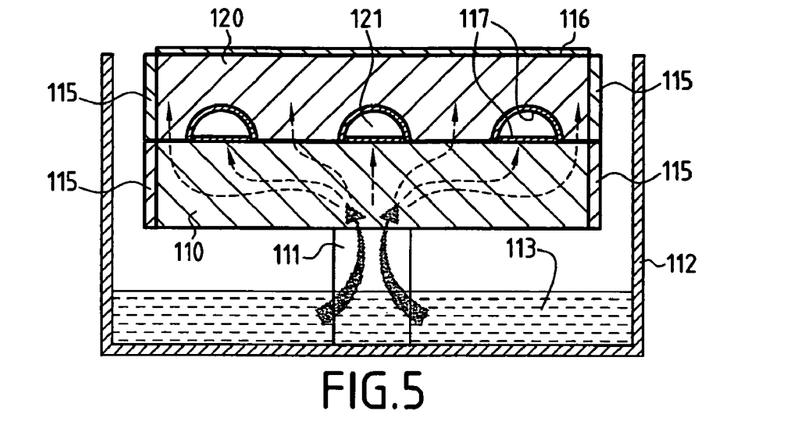
FIG. 5 is a diagram showing an application of a method in accordance with the invention to bonding together two fiber reinforcements by impregnation with a silicon-based composition.

FIG. 5 shows a first embodiment of such a structure in which a method in accordance with the present invention is used not only for leakproofing but also for assembling together two fiber reinforcements 110 and 120 during the operation of impregnating the substrate with the composition based on molten silicon. In this example, the porous substrate is made of two densified fiber reinforcements 110 and 120. Each of the fiber reinforcements is made of refractory fibers densified with a first phase of carbon and with a second phase of silicon carbide, as described above with reference to steps ST1 to ST3. Grooves 121 are formed in the reinforcement 120 so as to provide fluid circulation channels once the two reinforcements have been assembled together. Thereafter, the operation of impregnating the substrate formed by the two reinforcements with a silicon-based composition is performed, thereby simultaneously providing imperviousness and assembling the two reinforcements together.

In the example of FIG. 5, impregnation is performed by capillarity as described above with reference to FIGS. 2 and 3. The reinforcement 110 is placed on one or more studs 111 forming wicks and placed in a receptacle 112 containing a silicon-based composition 113. The reinforcement 120 is held against the reinforcement 110 by a weight or by special tooling. Thereafter, heat treatment is performed similar to that described with reference to FIG. 2 so as to melt the silicon-based composition and cause it to travel by capillarity along the stud(s) 111 towards the reinforcement 110. The molten composition then propagates into the pores in the reinforcement 110 and then into the pores in the reinforcement 120, as represented by dashed-line arrows in FIG. 5.

Impregnating the two reinforcements while they are held against each other in this way serves to bond together the contacting surfaces of the two reinforcements. This produces an impervious structure having channels in which a fluid can circulate without any risk of leakage. The example described herein is applicable to making a structure having channels. Nevertheless, the method of the invention can be implemented to achieve bonding between two reinforcements of arbitrary shape.

Prior to impregnating the reinforcements with the silicon-based composition, an anti-wetting layer 115 can be applied over the entire periphery of the two reinforcements and also on those zones of the reinforcements that are to form the channels. A layer 116 may also be applied to the surface of the reinforcement 120, with this layer being selected to have a thickness that is suitably fine, for the reasons explained above.

Figure 6A:
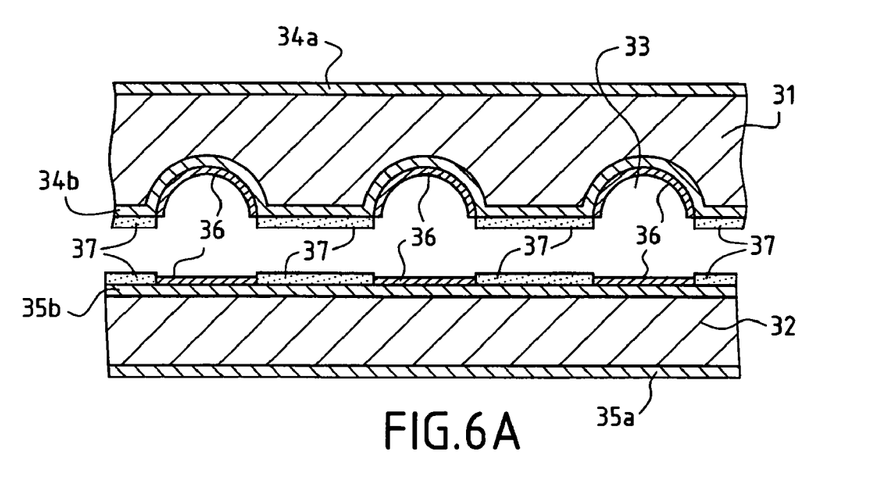
FIGS. 6A and 6B show an impervious structure being made by brazing together two parts manufactured in accordance with the method of the invention.
Figure 6B:
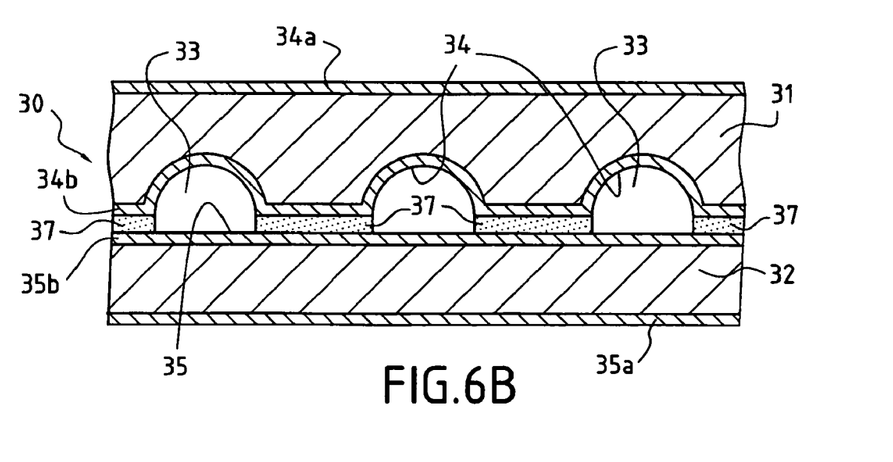

FIGS. 6A and 6B show an embodiment of a structure obtained by assembling together two panels made using a method of the invention and, specifically, constituting a structure 30 (FIG. 6B) for the wall of the diverging portion of a thruster nozzle that is cooled by circulating a fluid.

This structure is constituted by two panels 31 and 32 of C/C—SiC. These panels are made from substrates of porous composite material obtained under the same conditions as those described above (steps ST1 to ST6 of FIG. 1) and they are made to be impervious by being impregnated with molten silicon (step ST7).

One of the panels (31) has a surface in which grooves or recesses 33 are formed in order to constitute circulation channels for a fluid for cooling the structure. The surfaces of the panels 31 and 32 may initially be coated in a deposit of SiC forming coating layers 34a, 34b for the panel 31 and 35a, 35b for the panel 32. This SiC coating serves to protect the surface of the material of the structure against oxidation by ensuring that no silicon is apparent. It also increases the temperature of which the structure can be used whenever its surface temperature is higher than its core temperature, since SiC presents better high-temperature performance than does silicon.

On the surfaces of the panels that are to be in contact in order to form the fluid circulation circuit, the SiC coating layers 34b and 35b also serve to prevent silicon mixing with the brazing composition. Direct contact between the silicon of the material and the brazing composition could change the proportions of the components in the brazing composition by diffusion in the liquid state during brazing, thus modifying its properties.

The panels 31 and 32 are assembled to each other by brazing. For this purpose, the brazing composition 37 is deposited on those portions of the panels that are to come into contact. The brazing composition is selected as a function of its thermal expansion coefficient, which must be as close as possible to that of the material constituting the panels. Consequently, it is preferable to use a brazing composition based on silicon, as described in patent documents EP 0 806 402 or U.S. Pat. No. 5,975,407, or the brazing composition known as "TiCuSil®" from by the supplier Wesgo Metals, for example.

As shown in FIG. 6A, an anti-wetting agent 36 may be deposited on those zones of the panels that are not to be brazed together, in order to control the flow of the brazing composition so that it wets only those zones of the panels that come into contact.

The two surfaces of the panels as treated in this way are put into contact with an interposed brazing layer 37 on the contact zones, and the parts are brazed together by raising the temperature. When an anti-wetting agent is used, the brazing composition can be deposited coarsely on the surfaces that are to be assembled together, with the composition subsequently migrating to those zones that are not coated in the anti-wetting agent.

As shown in FIG. 6B, this leads to an impervious structure 30 having fluid circulation channels 33. After brazing, the anti-wetting agent can be removed by causing hydrochloric acid (HCl) to flow along the channels and around the structure.

If SiC is not deposited prior to brazing (as mentioned above), an SiC coating can be deposited subsequently in order to protect the surface of the structure against oxidation and increase the temperature at which it can be used.

Permeability has been measured on small brazed panels having three channels and dimensions of 115 mm×40 mm. The parts constituting the panels were made under the same conditions as those implemented for making the samples of Table I. The results in column 1 correspond to measurements performed on panels whose parts were made in accordance with the method of the invention and in particular using molten silicon to impregnate a porous substrate made of carbon fibers and densified by a matrix comprising a first phase of carbon and a second phase of silicon carbide, as described above. The measurements given in column 2 correspond to measurements performed on panels in which the elements were likewise made from porous substrates made using the same fibers and densified by a matrix comprising a first phase of carbon and a second phase of silicon carbide, but which were made to be impervious by depositing a layer of SiC using the gas process ("SiC-CVI") after previously applying a ceramized SiC precursor ("SiC painting") as described in patent document PCT/FR04/00202.

The measurement method used is the same as that described above, i.e. pumping a vacuum in the channels via a helium detector, while putting the outside of the part in a helium atmosphere. Table II below gives the results of the measurements performed.

TABLE II

| | 1 | 2 |
|---|---|---|
| Type of leakproofing | Impregnation with molten Si | SiC painting + SiC-CVI |
| Leakage measured on samples (in $Pa \cdot m^3/s$) | $<10^{-9}$ | in the range $2 \times 10^{-4}$ to $1 \times 10^{-3}$ |

It can be seen that leakage remains unchanged for a structure obtained by assembling together parts in accordance with the invention (column 1) and remains considerably better than that obtained using the other technique (column 2).

In addition, other small panels made in accordance with the method of the invention as described above have been subjected to severe operating conditions, specifically a heat flux of 1 megawatt per square meter ($MW/m^2$) while causing kerosene at a pressure of 32 bars to circulate in the channels. Leakage levels from the panels were then measured again. The values obtained were unchanged compared with those that were obtained prior to the test, which shows that the material of the invention conserves its imperviousness even after being subjected to severe conditions of use.

What is claimed is:

1. A method of manufacturing a part out of impervious thermostructural composite material, the method consisting of:
    forming a porous substrate from at least one fiber reinforcement made of refractory fibers;
    depositing a first phase of continuous carbon on said fiber reinforcement;
    depositing a second phase of continuous silicon carbide on the first phase of carbon and said fiber reinforcement so as to completely cover said first phase of carbon and said fiber reinforcement, and
    impregnating the silicon carbide deposition with a composition based on molten silicon so as to fill in pores of the silicon carbide deposition without the composition coming into contact with the continuous carbon or said fiber reinforcement.

2. A method according to claim 1, wherein the fiber reinforcement is densified by the second phase of silicon carbide by chemical vapor infiltration.

3. A method according to claim 1, wherein the fiber reinforcement is made of fibers having a coefficient of thermal expansion close to that of silicon carbide and/or to that of silicon.

4. A method according to claim 3, wherein the refractory fibers of the fiber reinforcement are fibers selected from silicon carbide fibers and carbon fibers having a natural or an artificial cellulose precursor, a polyacrylonitrile precursor (PAN), a pitch precursor, an organic resin precursor, or carboncore fibers.

5. A method according to claim 1, wherein the fiber reinforcement is densified by the first phase of carbon by chemical vapor infiltration of pyrolytic carbon.

6. A method according to claim 5, wherein the step of chemical vapor infiltration of pyrolytic carbon includes heat treatment.

7. A method according to claim 1, wherein depositing the fiber reinforcement with the first phase of carbon comprises impregnating the reinforcement with a liquid composition containing a carbon precursor polymer, cross-linking the polymer, and transforming the cross-linked polymer into carbon.

8. A method according to claim 1, wherein deposition of the second phase of silicon carbide is performed by chemical vapor infiltration.

9. A method according to claim 1, wherein the depositing the second phase of silicon carbide comprises impregnation by means of a liquid composition containing a silicon carbide precursor, and ceramizing the precursor.

10. A method of manufacturing a part out of impervious thermostructural composite material, the method consisting of:
    forming a porous substrate from at least one fiber reinforcement made of refractory fibers;
    depositing a first phase of continuous carbon on said fiber reinforcement;
    depositing a second phase of continuous silicon carbide on the first phase of carbon and said fiber reinforcement so as to completely cover said first phase of carbon and said fiber reinforcement,
    machining the substrate to open the pores in the material, and
    impregnating the silicon carbide deposition with a composition based on molten silicon so as to fill in pores of the silicon carbide deposition without the composition coming into contact with the continuous carbon or said fiber reinforcement.

11. A method according to claim 1, wherein the silicon-based composition is constituted by silicon or an alloy of silicon and another material selected from titanium, zirconium, molybdenum, and germanium.

12. A method of manufacturing a part out of impervious thermostructural composite material, the method consisting of:
    forming a porous substrate from at least one fiber reinforcement made of refractory fibers;
    depositing a first phase of continuous carbon on said fiber reinforcement;
    depositing a second phase of continuous silicon carbide on the first phase of carbon and said fiber reinforcement so as to completely cover said first phase of carbon and said fiber reinforcement, and
    impregnating the silicon carbide deposition with a composition based on molten silicon so as to fill in pores of the silicon carbide deposition without the composition coming into contact with the continuous carbon or said fiber reinforcement by means of a receptacle containing the molten silicon-based composition and at least one stud for supporting the substrate, the stud forming a wick for conveying the silicon-based molten composition by capillarity to the substrate so that it penetrates into the pores of the substrate.

13. A method of manufacturing an impervious thermostructural composite material structure, wherein at least two parts are made using a method a consisting of:
    forming a porous substrate from at least one fiber reinforcement made of refractory fibers;

depositing a first phase of continuous carbon on said fiber reinforcement;

depositing a second phase of continuous silicon carbide on the first phase of carbon and said fiber reinforcement so as to completely cover said first phase of carbon and said fiber reinforcement, and impregnating the silicon carbide deposition with a composition based on molten silicon so as to fill in pores of the silicon carbide deposition without the composition coming into contact with the continuous carbon or said fiber reinforcement A method of manufacturing; and said parts are assembled together by brazing after at least one of interposing a brazing composition between the surfaces of the parts that are to come into contact and forming a barrier against the brazing composition on those portions of the surfaces of the parts that are not to be brazed together.

14. A method according to claim 13, wherein depositing a second phase of continuous silicon carbide includes chemical vapor infiltration to form a deposit of silicon carbide on the surfaces of the parts to be assembled together.

15. A method according to claim 13, wherein, forming a barrier against the brazing composition includes applying an anti-wetting agent.

* * * * *

UNITED STATES PATENT AND TRADEMARK OFFICE
CERTIFICATE OF CORRECTION

| | | |
|---|---|---|
| PATENT NO. | : 7,736,554 B2 | Page 1 of 1 |
| APPLICATION NO. | : 11/105851 | |
| DATED | : June 15, 2010 | |
| INVENTOR(S) | : Jacques Thebault et al. | |

It is certified that error appears in the above-identified patent and that said Letters Patent is hereby corrected as shown below:

Column 4, line 19, "to in" should read --to be in--;

Column 7, line 29, "far its" should read --far to its--;

Column 8, line 16, "natures" should read --nature--;

Column 10, line 33, "from by the" should read --from the--;

Column 10, line 53, "an" should read --a--;

Column 11, claim 4, line 66, "boncore" should read --bon-core--;

Column 12, claim 13, line 64, delete "structure";

Column 12, claim 13, line 65, "a method a" should read --a method--; and

Column 13, claim 13, line 11, "reinforcement A method of manufacturing; and" should read --reinforcement; and--.

Signed and Sealed this
Eleventh Day of September, 2012

David J. Kappos
*Director of the United States Patent and Trademark Office*